US012754836B2

(12) United States Patent
Yoo et al.

(10) Patent No.: US 12,754,836 B2
(45) Date of Patent: Oct. 6, 2026

(54) STORAGE SYSTEM AND OPERATING METHOD THEREOF

(71) Applicant: SAMSUNG ELECTRONICS CO., LTD., Suwon-si (KR)

(72) Inventors: Hyunjoon Yoo, Suwon-si (KR); Seo-Hyun Shin, Suwon-si (KR); Soo-Young Ji, Suwon-si (KR); Seunghan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/038,524

(22) Filed: Jan. 27, 2025

(65) Prior Publication Data

US 2026/0037430 A1 Feb. 5, 2026

(30) Foreign Application Priority Data

Aug. 1, 2024 (KR) ........................ 10-2024-0102740

(51) Int. Cl.
*G06F 12/00* (2006.01)
*G06F 12/02* (2006.01)

(52) U.S. Cl.
CPC .. *G06F 12/0246* (2013.01); *G06F 2212/7211* (2013.01)

(58) Field of Classification Search
CPC ..................... G06F 12/0246; G06F 2212/7211
See application file for complete search history.

(56) References Cited

U.S. PATENT DOCUMENTS 7,913,032 B1 * 3/2011 Cornwell ............ G06F 12/0246 711/103
8,601,202 B1 * 12/2013 Melcher ............... G11C 16/349 711/159
10,409,720 B2 9/2019 Gorobets et al.
11,269,780 B2 3/2022 Curewitz et al.
11,416,163 B2 8/2022 Vlasov et al.
11,487,455 B2 11/2022 Kannan et al.
11,775,200 B2 10/2023 Sreedhar et al.
11,809,330 B2 11/2023 Goto et al.
11,972,153 B1 4/2024 Lercari et al.
2011/0320688 A1 * 12/2011 Lee ..................... G06F 12/0246 711/E12.008
2015/0242338 A1 * 8/2015 Lee ..................... G06F 12/0246 726/20

(Continued)

FOREIGN PATENT DOCUMENTS

KR 10-2022-0045216 A 4/2022

OTHER PUBLICATIONS

NVM Express, "Zoned Namespace Command Set Specification," Revision 1.1d, Dec. 28, 2023-Ratified (Jun. 25, 2024).

*Primary Examiner* — Craig S Goldschmidt
(74) *Attorney, Agent, or Firm* — Fish & Richardson P.C.

(57) ABSTRACT

The present disclosure provides a storage system including: a non-volatile memory configured to include a plurality of memory blocks and a storage controller. The storage controller is configured to receive a zone open request from a host, and to open a second zone to the host including a plurality of second memory blocks among the plurality of memory blocks based on read and write count information of a first zone including a plurality of first memory blocks among the plurality of memory blocks and based on a wear level of the plurality of memory blocks.

20 Claims, 13 Drawing Sheets

(56) References Cited

U.S. PATENT DOCUMENTS

| | | | | |
|---|---|---|---|---|
| 2017/0199681 | A1* | 7/2017 | Jain | G06F 9/505 |
| 2017/0286288 | A1* | 10/2017 | Higgins | G06F 12/0246 |
| 2022/0121563 | A1* | 4/2022 | Kamran | G06F 3/0688 |
| 2022/0261164 | A1 | 8/2022 | Zhuravlev et al. | |
| 2024/0020054 | A1 | 1/2024 | Desanti | |
| 2024/0069722 | A1 | 2/2024 | Bahirat | |
| 2024/0176517 | A1* | 5/2024 | Lin | G06F 3/0625 |

* cited by examiner

FIG. 5

500

| BLK | READ REQUEST | WRITE REQUEST |
|---|---|---|
| BLK1 | 20 | 534 |
| BLK2 | 234 | 202 |
| ⋮ | | |
| BLKz | 174 | 15 |

FIG. 8

800

| ZONE No. (810) | HOST INFO. (820) | READ REQUST (830) | WRITE REQUEST (840) | WRITE POINTER (850) |
|---|---|---|---|---|
| 0 | 1 | 51 | 189 | 1 |
| 1 | 2 | 11 | 10 | 4 |
| ⋮ | | | | |
| N | 3 | 132 | 11 | 7 |

STORAGE SYSTEM AND OPERATING METHOD THEREOF

CROSS-REFERENCE TO RELATED APPLICATION(S)

This application claims priority to and the benefit of Korean Patent Application No. 10-2024-0102740, filed in the Korean Intellectual Property Office on Aug. 1, 2024, the entire contents of which are incorporated herein by reference.

BACKGROUND

The disclosure relates to a storage system and an operating method therefor.

In a data center, hundreds or thousands of computer servers are installed in one position to provide various and stable services (e.g., a web server, a mail server, a file server, a video server, or a cloud server) to users of different services. Data centers may store various data and provide services using storage devices such as solid state drives (SSDs). SSDs with high processing speeds are mainly used to satisfy quality of service (QoS) of services provided to clients requesting connection to a data center. The SSDs have a shorter lifespan than that of hard disk drives (HDDs), so management methods to improve the lifespan of the SSDs are required.

SUMMARY

Some implementations attempt to provide a storage system and an operating method therefor, capable of performing a zone change based on properties of a memory block to reduce a wear level difference.

Some implementations attempt to provide a storage system and an operating method therefor, capable of performing garbage collection based on properties of a memory block to reduce a wear level difference.

Some implementations of the present disclosure provide a storage system including: a non-volatile memory configured to include a plurality of memory blocks; and a storage controller configured to receive a zone open request from a host, and to open a second zone to the host including a second subset of memory blocks among the plurality of memory blocks based on read/write count information of a first zone corresponding to the host and based on a wear level of the plurality of memory blocks, wherein the first zone includes a first subset of memory blocks among the plurality of memory blocks.

Some implementations of the present disclosure provide an operating method for a storage system, including: allocating a plurality of memory blocks to a plurality of zones based on a zone open request from a plurality of hosts; opening a corresponding zone among the plurality of zones to each of the plurality of hosts; receiving a zone change request from a first host among the plurality of hosts; checking a read/write level of a first zone corresponding to the first host among the plurality of zones; checking a wear level of the plurality of memory blocks; and changing a zone opened to the first host based on the read/write level of the first zone and based on the wear level of the plurality of memory blocks.

Some implementations of the present disclosure provide a storage system including: a non-volatile memory configured to include a plurality of memory blocks; and a storage controller configured to receive a request to write a data for a first memory block among the plurality of memory blocks from a host and to perform garbage collection for the first memory block based on read/write count information of the first memory block and a wear level of the plurality of memory blocks.

BRIEF DESCRIPTION OF THE DRAWINGS

FIG. 5 illustrates an example of a read/write (R/W) table according to some implementations.

FIG. 8 illustrates an example of a zone management table according to some implementations.

DETAILED DESCRIPTION

Figure 1:
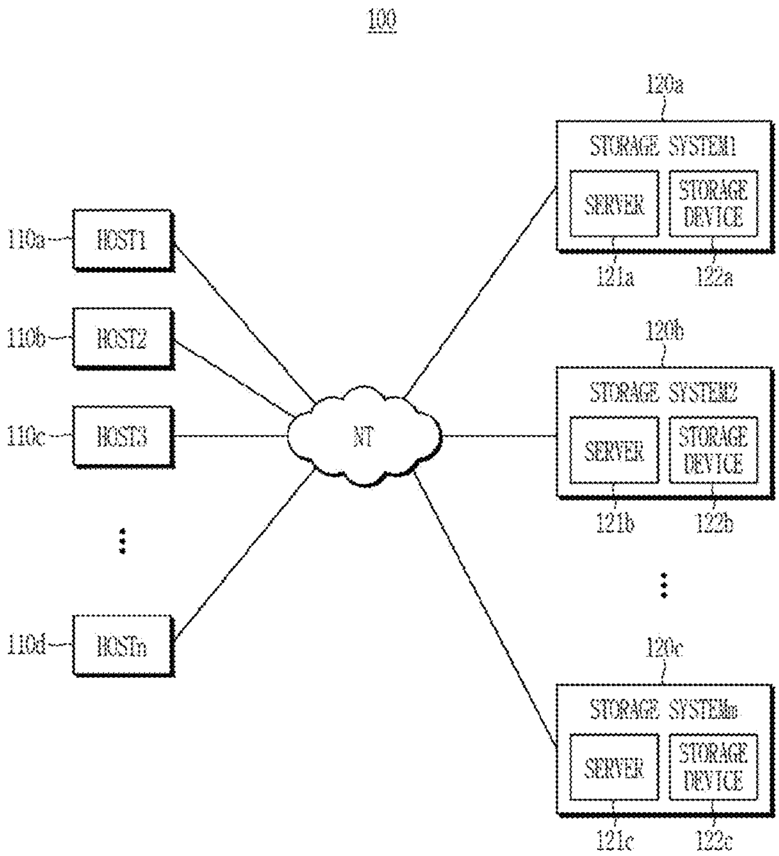
FIG. 1 illustrates a block diagram of a computing system according to some implementations.

In the following detailed description, only certain implementations of the present disclosure have been shown and described, simply by way of illustration. As those skilled in the art would realize, the described implementations may be modified in various different ways, all without departing from the spirit or scope of the present disclosure.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various component and are not to be interpreted as limiting these components. These terms may be used for the purpose of distinguishing one constituent element from other constituent elements.

FIG. 1 illustrates a block diagram of a computing system according to some implementations.

Referring to FIG. 1, the computing system 100 may include a plurality of hosts 110*a*, 110*b*, 110*c*, . . . , and 110*d*, a network NT, and a plurality of storage systems 120*a*, 120*b*, . . . , and 120*c*.

The hosts 110*a*, 110*b*, 110*c*, . . . , and 110*d* may be connected to the network NT, and may communicate with the storage systems 120*a*, 120*b*, . . . , and 120*c* through the network NT. The hosts 110*a*, 110*b*, 110*c*, . . . , and 110*d* may respectively indicate computers (clients), virtual devices running within a computer, virtual devices running on computers, or computer programs (or applications) running within a computer, but the present disclosure is not limited thereto. The hosts 110*a*, 110*b*, 110*c*, . . . , and 110*d* may store commands, codes, files, image data, contents, services, etc., in the storage systems 120*a*, 120*b*, . . . , and 120*c* through the network NT, or may read from the storage systems 120*a*, 120*b*, . . . , and 120*c*.

The network NT may be formed of not only communication methods using mobile communication networks, wired Internet, wireless Internet, broadcasting networks, etc., but also short-range wireless communication between devices. For example, the network NT may include one or more of the following networks: ad hoc networks, intranets, extranets, personal area networks (PANs), local area networks (LANs), wireless LANs, campus area networks (CANs), metropolitan area networks (MANs), wide area networks (WANs), broadband networks (BBNs), public switched telephone networks (PSTNs), the Internet, etc. In some implementations, the network NT may be implemented using Ethernet. The network NT may be a general network such as a TCP/IP network. The network NT may include a plurality of switches as network elements, and the switches may respectively connect the hosts 110*a*, 110*b*, 110*c*, . . . , and 110*d* to the storage systems 120*a*, 120*b*, . . . , and 120*c*.

Each of the storage systems 120*a*, 120*b*, . . . , and 120*c* may include one or more servers 121*a*, 121*b*, . . . , and 121*c* connected to the network NT. The servers 121*a*, 121*b*, . . . , and 121*c* may implement various architectures and techniques, including, but not limited to, direct attached storage (DAS), network attached storage (NAS), storage area network (SAN), fiber channel (FC), fiber channel over Ethernet (FCoE), mixed architecture networks, etc. In some examples, the servers 121*a*, 121*b*, . . . , and 121*c* may be a virtualized environment.

Each of the storage systems 120*a*, 120*b*, . . . , and 120*c* may include one or more storage devices 122*a*, 122*b*, . . . , and 122*c*. Each of the storage devices 122*a*, 122*b*, . . . , and 122*c* may store data according to commands from the hosts 110*a*, 110*b*, 110*c*, . . . , and 110*d*. A detailed description of the storage system will be provided with reference to FIG. 2.

Figure 2:
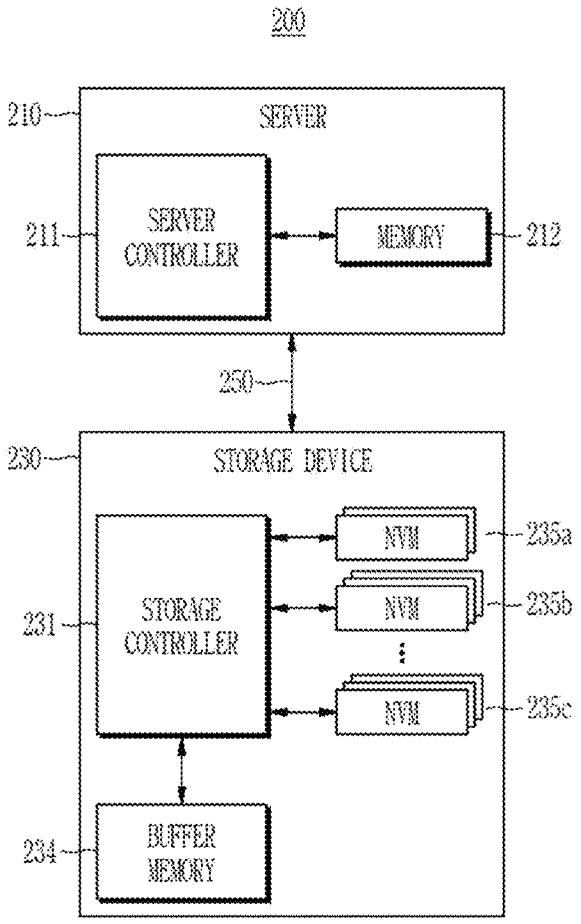
FIG. 2 illustrates a block diagram of a storage system according to some implementations.

FIG. 2 illustrates a block diagram of a storage system according to some implementations.

The storage system 200 may include a server 210 and a storage device 230. The server 210 may provide read and write requests from a plurality of hosts 110*a*, 110*b*, 110*c*, . . . , and 110*d* (in FIG. 1) to the storage device 230. For example, the server 210 may transmit a data write request to the storage device 230 or a data read request to the storage device 230 based on a host command, and may provide data received from the storage device 230 to the host. Additionally, the server 210 may transmit a zone open request or a zone size change request to the storage device 230 based on a host command. In this case, the server 210 may also transmit host information to the storage device 230.

The server 210 may include a server controller 211 and a memory 212.

The server controller 211 may control an operation of the server 210 and, for example, may run an operating system (OS). The memory 212 may store instructions and data that are executed and processed by the server controller 211. For example, the operating system executed by the server controller 211 may include a file system for file management, and a device driver for controlling peripheral devices including the storage device 230 at an operating system level.

The server 210 may communicate with the storage device 230 through a communication link 250. For example, the server 210 may communicate with the storage device 230 through various interfaces such as a universal serial bus (USB), a MultiMediaCard (MMC), peripheral component interconnect-express (PCI-E), an AT attachment (ATA), a serial AT attachment (SATA), a parallel AT attachment (PATA), a small computer system interface (SCSI), a serial attached SCSI (SAS), an enhanced small disk interface (ESDI), an integrated drive electronics (IDE), and an non-volatile memory express (NVMe).

The storage device 230 may be accessed by the server 210. The storage device 230 may include a storage controller 231, a plurality of non-volatile memories 235*a*, 235*b*, . . . , and 235*c*, and a buffer memory 234. The storage device 230 may store or process data in response to a command from the server 210. For example, the storage device 230 may include a solid state drive (SSD), a smart SSD, a peta byte level (PB) SSD, an embedded MultiMediaCard (eMMC), an embedded universal flash storage (UFS) memory device, a UFS memory card, a compact flash (CF), a secure digital (SD), a micro secure digital (Micro-SD), a mini secure digital (Mini-SD), an extreme digital (xD), or a memory stick.

The storage controller 231 may control an operation of the storage device 230. For example, the storage controller 231 may control operations of the non-volatile memories 235*a*, 235*b*, . . . , and 235*c* based on commands, addresses, and data received from the server 210. The storage controller 231 may include an embedded logic for processing requests from the server 210 to copy (e.g., write) data to the storage device 230.

The non-volatile memories 235*a*, 235*b*, . . . , and 235*c* may store data. For example, the non-volatile memories 235*a*, 235*b*, . . . , and 235*c* may store metadata and other user data.

Each of the non-volatile memories 235*a*, 235*b*, . . . , 235*c* may include a memory cell array including non-volatile memory cells capable of maintaining stored data even when power to the storage device 230 is cut off, and the memory cell array may be divided into a plurality of memory blocks. The memory blocks may have a two-dimensional horizontal structure in which the memory cells are arranged in the same plane (or layer) two-dimensionally, or a three-dimensional (3D) vertical structure in which the non-volatile memory cells are arranged three-dimensionally. The memory cell may be a single-level cell (SLC), which stores one bit of data, or a multi-level cell (MLC), which stores two or more bits of data. However, the present disclosure is not limited thereto, and each memory cell may be a triple level cell (TLC: triple level cell) storing 3 bits of data or a quadruple level cell (QLC: quadruple level cell) storing 4 bits of data.

Each of the non-volatile memory 235*a*, 235*b*, . . . , and 235*c* may include a plurality of dies, or a plurality of chips, each including a memory cell array. For example, each of the non-volatile memories 235*a*, 235*b*, . . . , and 235*c* may include a plurality of chips, and each of the chips may include a plurality of dies. In some implementations, the non-volatile memories 235_a_, 235_b_, . . . , 235_c_ may also include a plurality of channels, each of which includes a plurality of chips.

Each of the non-volatile memories 235_a_, 235_b_, . . . , and 235_c_ may include a NAND flash memory. In other implementations, the non-volatile memories 235_a_, 235_b_, . . . , and 235_c_ may each include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. Hereinafter, in the present disclosure, descriptions will be provided assuming that each of the nonvolatile memories 235_a_, 235_b_, . . . , and 235_c_ is a NAND flash memory device.

The buffer memory 234 may store instructions and data that are executed and processed by the storage controller 231. The buffer memory 234 may temporarily store data that is stored in the non-volatile memories 235_a_, 235_b_, . . . , and 235_c_ or data to be stored.

The buffer memory 234 may be implemented as a volatile memory such as a dynamic random access memory (DRAM), a static RAM (SRAM), etc. However, the present disclosure is not limited thereto, and the buffer memory 234 may be implemented with various types of non-volatile memory, including a resistive non-volatile memory such as a magnetic RAM (MRAM), a phase change RAM (PRAM), or a resistive RAM (ReRAM), a flash memory, a nano floating gate memory (NFGM), a polymer random access memory (PRAM), or an ferroelectric random access memory (FRAM). In the present implementations, the buffer memory 234 is shown as being provided outside the storage controller 231, but the present disclosure is not limited thereto, and the buffer memory 234 may be provided inside the storage controller 231.

In some implementations, the storage controller 231 may set the non-volatile memories 235_a_, 235_b_, . . . , and 235_c_ as a plurality of zones. Each of the multiple zones may be defined in various ways, and as an example, a size of each of the zones may be defined in various ways. For example, each of the zones may include a plurality of memory blocks. In some implementations, each of the zones may have a size larger than a write or read unit of data. Meanwhile, the size of the zones is not limited to the examples described above, and the sizes of the respective zones may be the same or different. Hereinafter, each of the zones is described as being set up in units of a plurality of memory blocks.

In some implementations, the storage controller 231 may sequentially store data in each zone. Specifically, the storage controller 231 may sequentially store data from a first storage position of each of the zones. For example, when the storage controller 231 initially stores data in each zone, the storage controller 231 may sequentially store data from the first storage position of each of the zones. Then, when the storage controller 231 additionally stores data in each zone, the storage controller 231 may check a storage position where data was last written in each of the zones, and may sequentially store data starting from a next storage position of the checked storage position.

In some implementations, the storage controller 231 may allocate a plurality of memory blocks to the zones based on initial zone open requests from a plurality of hosts and open a corresponding zone among the zones as an initial zone for each of the hosts. Each of the zones may store data of a corresponding host. For example, a first zone among the zones may store data of a first host among the hosts, and a second zone among the zones may store data of a second host among the hosts. Accordingly, the server controller 211 may determine a zone in which data is to be written based on a write request from the host, and may transmit a write request including a logical address corresponding to the determined zone (e.g., a logical address indicating a start position of the zone) to the storage device 230. Then, the storage device 230 may check the zone corresponding to the logical address included in the write request, may check a storage position where data was last written in the checked zone, and may sequentially store the received write data from a next storage position of the checked storage position. In this way, a storage system that sets up a storage space into multiple zones and may sequentially store data in each zone may be referred to as Zoned Namespaces (ZNS) storage.

In some implementations, the storage controller 231 may manage the multiple zones. For example, the storage controller 231 may count a number of read/write operations of multiple memory blocks, and may determine a read/write level of the multiple memory blocks. The storage controller 231 may determine a read/write level of a zone including the memory blocks based on the read/write levels of the memory blocks. The storage controller 231 may determine a wear level of the memory blocks according to a degree of deterioration of the memory blocks, and may generate wear level information of the memory blocks.

In some implementations, in a case where data is written from a start point of a write to an end point of the write in a corresponding zone in response to a host write request, the zone may become full. In such a case, the storage controller 231 may prohibit additional writes to the zone, and may instruct the host to make a zone close request for the zone and a zone open request for the zone. According to a direction of the storage controller 231, the host may request a zone close for the corresponding zone and a zone open for a new zone.

In some implementations, the storage controller 231 may process various requests for multiple zones. For example, the storage controller 231 may close a zone allocated to a host, open an additional zone to the host, or change a size of a zone opened to the host, according to a host request. Specifically, the storage controller 231 may close the zone and manage it as read-only according to a zone close request received from the host. The storage controller 231 may open an additional zone to the host according to a zone open request received from the host. Alternatively, the storage controller 231 may expand a size of a zone opened to the host or reduce a size of a zone opened to the host according to a zone size change request received from the host. In this case, the storage controller 231 may consider a read/write level of a zone previously opened to the host and a wear level of memory blocks to be opened to the host. This will be described in detail with reference to FIG. 3 to FIG. 12.

In some implementations, the storage device 230 may include a solid state drive (SSD). In other implementations, the storage device 230 may include a universal flash storage (UFS), a MultiMediaCard (MMC) or an embedded MMC (eMMC). In other implementations, the storage device 230 may be implemented in the form of a secure digital (SD) card, a micro SD card, a memory stick, a chip card, a universal serial bus (USB) card, a smart card, a compact flash (CF) card or the like.

The buffer memory 234 may be implemented as a volatile memory such as a dynamic random access memory (DRAM), a static RAM (SRAM), etc. However, the present disclosure is not limited thereto, and the buffer memory 234 may be implemented with various types of non-volatile memory, including a resistive non-volatile memory such as a magnetic RAM (MRAM), a phase change RAM (PRAM), or a resistive RAM (ReRAM), a flash memory, a nano floating gate memory (NFGM), a polymer random access memory (PRAM), or an ferroelectric random access memory (FRAM). In the present implementations, the buffer memory 234 is shown as being provided outside the storage controller 231, but the present disclosure is not limited thereto, and the buffer memory 234 may be provided inside the storage controller 231. In some implementations, the storage device 230 may be a smart SSD including a field programmable gate array (FPGA), and each of the non-volatile memories 235*a*, 235*b*, . . . , and 235*c* may further include a storage controller and a buffer memory.

Figure 3:
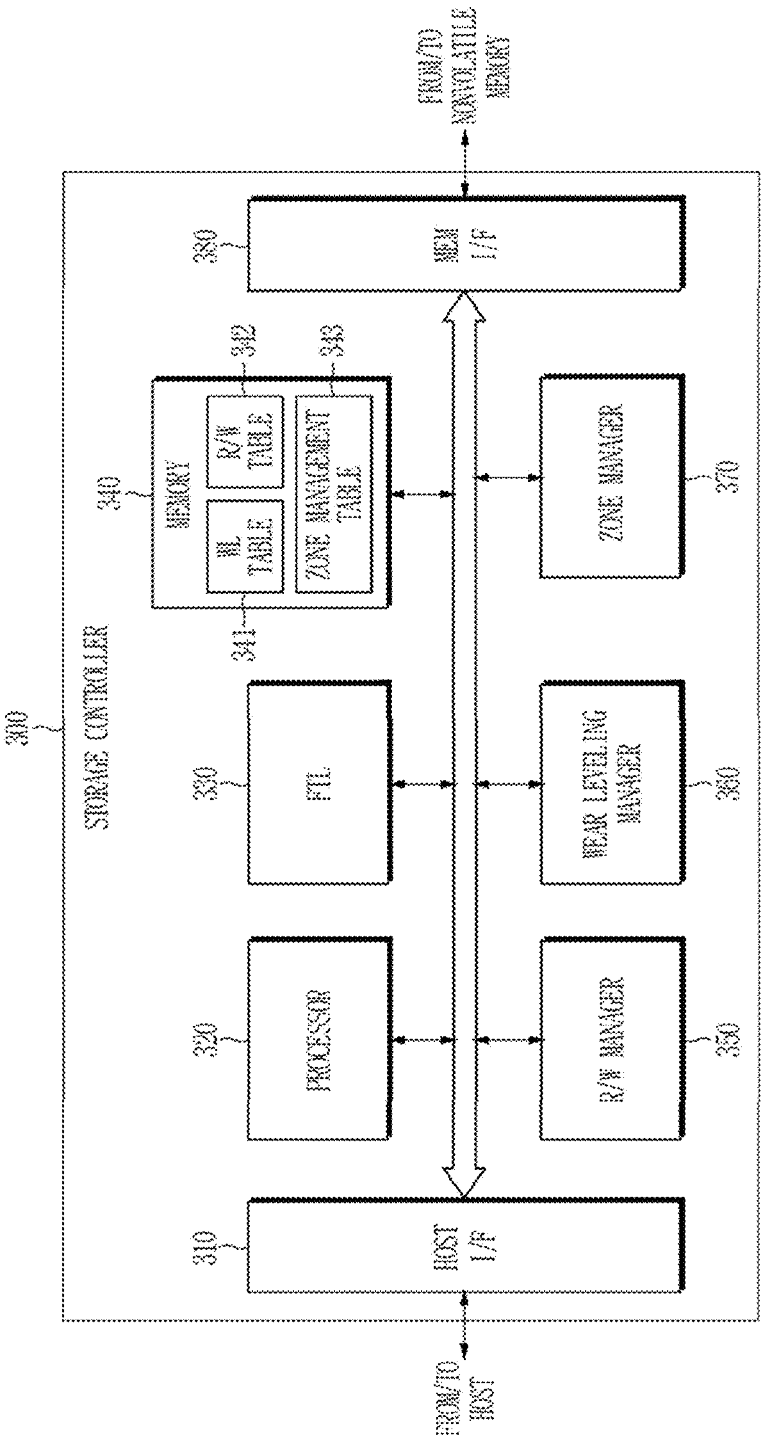
FIG. 3 illustrates a block diagram showing an example of a storage controller included in a storage device according to some implementations.

FIG. 3 illustrates a block diagram showing an example of a storage controller included in a storage device according to some implementations.

Referring to FIG. 3, the storage controller 300 may include a host interface circuit 310, at least one processor 320, an FTL 330, a memory 340, a read/write (R/W) manager 350, a wear leveling manager 360, a zone manager 370, and a memory interface circuit 380.

The host interface circuit 310 may provide a physical connection between a host (or server) and a storage device. That is, the host interface circuit 310 may provide interfacing with a storage device corresponding to a bus format of the host device. In some implementations, the host interface circuit 310 may be applied with at least one of various interface methods such as an USB, an MMC, a PCI-E, an ATA, an SATA, a PATA, an SCSI, an SAS, an ESDI, an IDE, an NVMe, etc.

The processor 320 may control an operation of the storage controller 300 in response to a command received from the host (or server) through the host interface circuit 310. For example, the processor 310 may control each configuration by utilizing firmware for driving the storage device.

The flash translation layer (FTL) 330 may include firmware or software that manages data read, write, and erase operations of the nonvolatile memories 235*a*, 235*b*, . . . , and 235*c* (in FIG. 2). The firmware of the FTL 330 may be executed by the processor 320.

The FTL 330 may perform an address mapping operation that changes a logical address received from a host (or server) into a physical address used to actually store data in a non-volatile memory. Specifically, the FTL 330 may map the logical address from the server or host to the physical address of the non-volatile memory using an address mapping table. The FTL 330 may perform garbage collection to secure available capacity within the non-volatile memories 235*a*, 235*b*, . . . , and 235*c*.

The memory 340 may store instructions and data that are executed and processed by the processor 320. For example, the memory 340 may be implemented as a volatile memory such as a DRAM or a static RAM (SRAM) or a non-volatile memory such as a PRAM or a flash memory. The memory 340 may store firmware and data for controlling the storage controller 300. The stored firmware and data may be driven or processed by the processor 320. In some implementations, the memory 340 may include a wear level information table 341, an R/W table 342, and a zone management table 343 for each memory block.

When the R/W manager 350 receives a read request for a read-target word line, it may increase a read count of a memory block including the read-target word line. When the R/W manager 350 receives a write request for a write-target word line, it may increase a write count of a memory block including the write-target word line. The R/W manager 350 may determine a R/W level of the memory blocks based on a read/write count of the memory blocks. The R/W manager 350 may update read/write count information for each memory block in the memory 340.

The R/W manager 350 may be implemented in software (or firmware) or hardware. Alternatively, the R/W manager 350 may be implemented as a combination of software and hardware. When the R/W manager 350 is implemented in software, commands of a program constituting the R/W manager 350 may be loaded into the memory 340 and executed by the processor 320.

The wear leveling manager 360 may generate wear level information of a memory block. In some implementations, the wear leveling manager 360 may use program/erase (P/E) cycle information of each region of non-volatile memories 235*a*, 235*b*, . . . , and 235*c* as a wear level. In addition, the wear leveling manager 360 may use at least one of an on cell count OCC1, an off cell count OCC2, a retention time, an erase count, or a number of error bits of read data as a wear level. Hereinafter, wear level information is described to be P/E cycle information. For example, the wear leveling manager 360 may count a P/E cycle of each memory block, and may store P/E cycle information for each memory block in the form of a table in the memory 340.

The zone manager 370 may generate information related to multiple zones. For example, the zone manager 370 may update read/write count information of each of the zones in the memory 340 based on read/write count information of the memory blocks included in each of the zones. Specifically, the zone manager 370 may update a sum of read counts of the memory blocks included in each of the zones as read count information of each of the zones, and may update a sum of write counts of the memory blocks included in each of the zones as write count information of each of the zones. The zone manager 370 may further include a plurality of zone numbers for each of the zones and a plurality of host information corresponding to each of the zones.

In some implementations, when the storage controller 300 receives a host command requesting a zone open, the zone manager 370 may determine which zone to open additionally to the host based on read/write count information of the zone corresponding to the host and wear levels of the memory blocks. For example, when the storage controller 300 receives a zone open request from a first host, the zone manager 370 may check read/write count information of a zone corresponding to the first host, and if it determines that a read count of the zone corresponding to the first host is greater than a write count, it may determine a zone including memory blocks with a high wear level to be opened to the first host. This will be described in detail with reference to FIG. 9 to FIG. 12.

The memory interface circuit 380 may communicate with non-volatile memories. The memory interface circuit 380 may transmit data to the non-volatile memories, and may receive data read from the non-volatile memories. In some implementations, the memory interface circuit 380 may be connected to the non-volatile memories through one channel. In other implementations, the memory interface circuit 380 may be connected to the non-volatile memories through a plurality of channels.

The storage controller 300 may further include an error checking and correcting (ECC) engine that performs ECC encoding and ECC decoding by using encoded modulation such as a Bose-Chaudhuri-Hocquenghem (BCH) code, a low density parity check (LDPC) code, a turbo code, a Reed-Solomon Code, a convolution code, a recursive systematic code (RSC), Trellis-coded modulation (TCM), block coded modulation (BCM), or other error correction codes.

Figure 4:
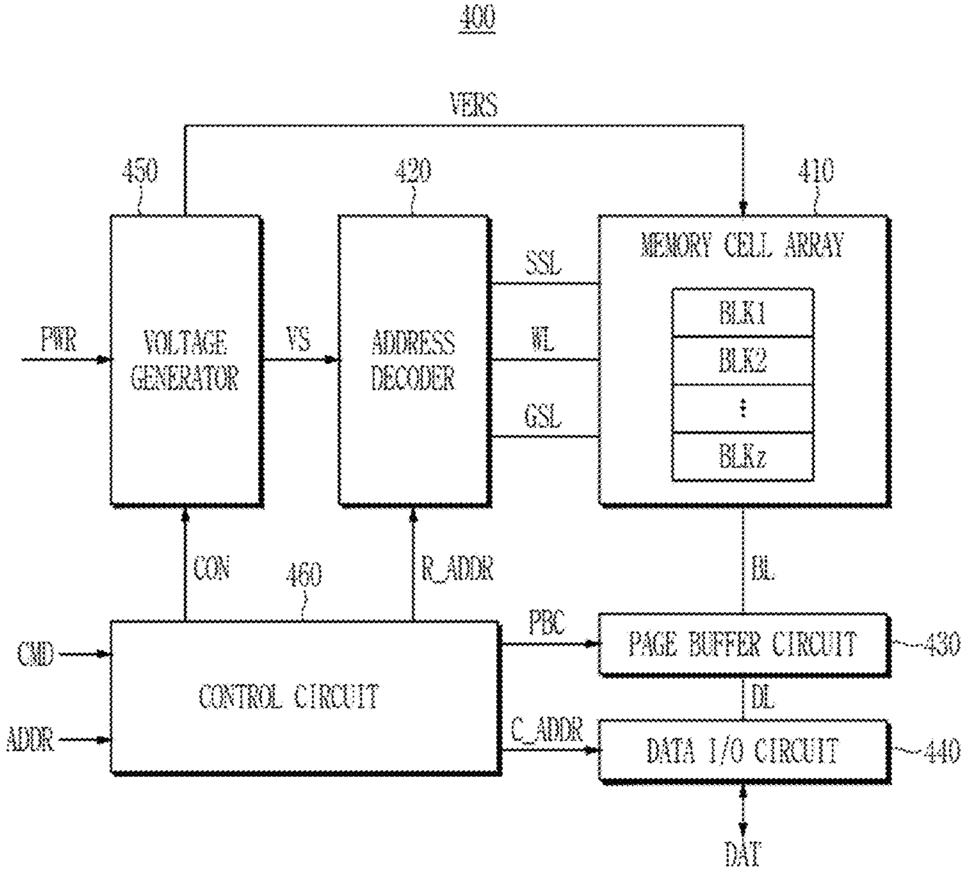
FIG. 4 illustrates a block diagram showing an example of non-volatile memory included in a storage device according to some implementations.

FIG. 4 illustrates a block diagram showing an example of non-volatile memory included in a storage device according to some implementations.

Referring to FIG. 4, the non-volatile memory 400 may include a memory cell array 410, an address decoder 420, a page buffer circuit 430, a data input/output circuit 440, a voltage generator 450, and a control circuit 460. For example, the non-volatile memory 400 may be one of the non-volatile memories 235*a*, 235*b*, . . . , and 235*c* of FIG. 2.

The memory cell array 410 may be connected to the address decoder 420 through a plurality of string selection lines SSL, a plurality of word lines WL, and a plurality of ground selection lines GSL. Additionally, the memory cell array 410 may be connected to the page buffer circuit 430 through a plurality of bit lines BL. The memory cell array 410 may include a plurality of memory cells connected to the word lines WL and the bit lines BL. The memory cell array 410 may be divided into a plurality of memory blocks BLK1, BLK2, . . . , and BLKz, each of which includes memory cells. Additionally, each of the memory blocks BLK1 to BLKz may be divided into a plurality of pages.

According to some implementations, the memory cell array 410 may be formed to have a two-dimensional array structure or a three-dimensional vertical array structure.

The control circuit 460 may receive a command CMD and an address ADDR from an external source (e.g., the server 210 and/or the storage controller 231 of FIG. 2), and may control an erase loop, a program loop, and a read operation of the non-volatile memory 400 based on the command CMD and the address ADDR. Herein, the program loop may include a program operation and a program verification operation, and the erase loop may include an erase operation and an erase verification operation. Herein, the read operation can include a normal read operation and a data recovery read operation.

For example, the control circuit 460 may generate control signals CON for controlling the voltage generator 450 and control signals PBC for controlling the page buffer circuit 430 based on the command CMD, and may generate a row address R_ADDR and a column address C_ADDR based on the address ADDR. The control circuit 460 may provide the row address R_ADDR to the address decoder 420 and the column address C_ADDR to the data input/output circuit 440.

The address decoder 420 may be connected to the memory cell array 410 through the string selection lines SSL, the word lines WL, and the ground selection lines GSL.

For example, during an erase/program/read operation, the address decoder 420 may determine at least one of the word lines WL as a selected word line in response to the row address R_ADDR, and may determine the remaining word lines, except for the selected word line, as unselected word lines among the word lines WL.

Additionally, during the erase/program/read operation, the address decoder 420 may determine at least one of the string selection lines SSL as a selected string selection line in response to the row address R_ADDR, and may determine the remaining string selection lines as non-selected string selection lines.

Furthermore, during the erase/program/read operation, the address decoder 420 may determine at least one of the ground selection lines GSL as a selected ground selection line and determine the remaining ground selection lines as unselected ground selection lines in response to the row address R_ADDR.

The voltage generator 450 may generate voltages VS required for an operation of the non-volatile memory 400 based on a power voltage PWR and control signals CON. The voltages VS may be applied to the string selection lines SSL, the word lines WL, and the ground selection lines GSL through the address decoder 420. In addition, the voltage generator 450 may generate an erase voltage VERS required for the erase operation based on the power voltage PWR and the control signals CON. The erase voltage VERS may be applied directly to the memory cell array 410 or through the bit line BL.

The page buffer circuit 430 may be connected to the memory cell array 410 through a plurality of bit lines BL. The page buffer circuit 430 may include a plurality of page buffers. In some implementations, one bit line may be connected to one page buffer. In other implementations, more than two bit lines may be connected to a single page buffer.

The page buffer circuit 430 may store write data DAT to be programmed into the memory cell array 410, or may store read data DAT detected from the memory cell array 410. That is, the page buffer circuit 430 may operate as a write driver or a detection amplifier depending on an operating mode of the non-volatile memory 400.

The data input/output circuit 440 may be connected to the page buffer circuit 430 through the data lines DL. The data input/output circuit 440 may provide the write data DAT to the memory cell array 410 through the page buffer circuit 430 or provide read data DAT outputted from the memory cell array 410 to the outside through the page buffer circuit 430, in response to the column address C_ADDR.

FIG. 5 illustrates an example of a read/write (R/W) table according to some implementations.

Referring to FIG. 5, the R/W table 500 may include read/write count information for each of the memory blocks BLK1, BLK2, . . . , and BLKz. Read count information may include a number of times a read request is received, and write count information may include information related to a number of times a write request is received. In some implementations, the read count information of each of the memory blocks BLK1, BLK2, . . . , and BLKz may include a sum of the number of times a read operation is performed on word lines included in each of the memory blocks BLK1, BLK2, . . . , and BLKz. The write count information of each of the memory blocks BLK1, BLK2, . . . , and BLKz may be a sum of the number of times a write operation is performed on word lines included in each of the memory blocks BLK1, BLK2, . . . , and BLKz. In some implementations, the R/W table 500 may further include information related to a number of erases or read errors of the memory blocks BLK1, BLK2, . . . , and BLKz.

In some implementations, when the R/W manager 350 (in FIG. 3) may receive a read request for a read target word line from the host or a write request for a write-target word line, it may update the R/W table 500 indicating read/write count information for each memory block.

Figure 6:
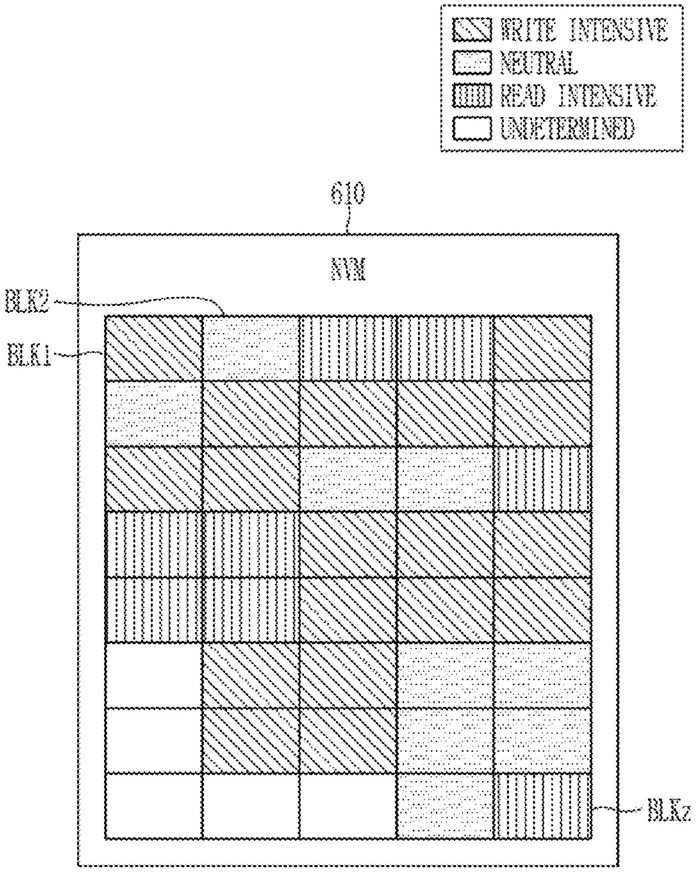
FIG. 6 illustrates a block diagram showing a R/W level for each memory cell block of non-volatile memory according to some implementations.

FIG. 6 illustrates a block diagram showing a R/W level for each memory cell block of non-volatile memory according to some implementations.

Referring to FIG. 6, a non-volatile memory 610 may include the memory blocks BLK1, BLK2, . . . , and BLKz. Each of the memory blocks BLK1, BLK2, . . . , and BLKz may be determined to be one of multiple read/write levels based on read/write count information. For example, each of the memory blocks BLK1, BLK2, . . . , and BLKz may be determined as one of the read/write levels depending on whether a difference between read count information and write count information exceeds a threshold.

Referring to FIGS. 5 and 6 together, the memory block BLK1 has read count information of 20 and write count information of 534, so there is more write count information than read count information, and the difference between the read count information and the write count information exceeds a threshold (e.g., 100). Accordingly, the memory block BLK1 may be determined as a first level WRITE INTENSIVE among multiple read/write levels. The memory block BLK2 has read count information of 234 and write count information of 202, so the difference between the read count information and the write count information is smaller than the threshold. Accordingly, the memory block BLK2 may be determined as a second level NEUTRAL among the read/write levels. The memory block BLKz has read count information of 174 and write count information of 15, so there is more read count information than write count information, and the difference between the read count information and the write count information exceeds a threshold (e.g., 100). Accordingly, the memory block BLKz may be determined as a third level READ INTENSIVE among the read/write levels. In addition, a memory block on which a read/write operation has not been performed may be determined as a fourth level UNDETERMINED among the read/write levels.

Figure 7:
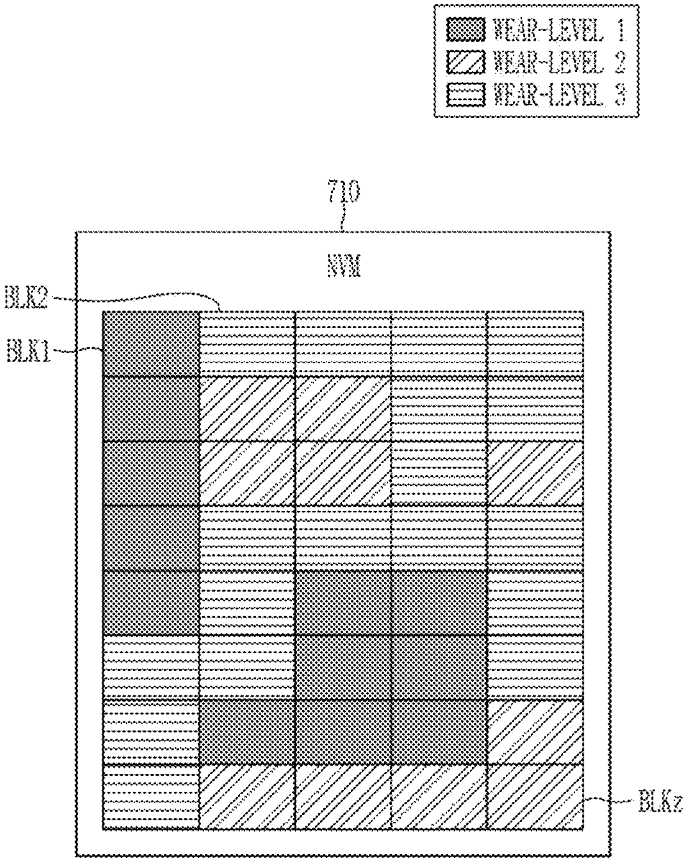
FIG. 7 illustrates a block diagram showing a wear level for each memory cell block of a non-volatile memory according to some implementations.

FIG. 7 illustrates a block diagram showing a wear level for each memory cell block of a non-volatile memory according to some implementations.

In some implementations, each of the memory blocks BLK1, BLK2, . . . , and BLKz of a non-volatile memory 710 may be determined as one level of a plurality of wear levels according to a degree of degradation. For example, each of the memory blocks BLK1, BLK2, . . . , and BLKz may be determined as one of a plurality of wear levels based on information related to degradation (OCC1, OCC2, P/E cycles, retention time, etc.). In some implementations, each of the memory blocks BLK1, BLK2, . . . , and BLKz may be determined as one of the wear levels based on a number of P/E cycles.

Referring to FIG. 7, among the wear levels, a first wear level WEAR-LEVEL 1 indicates relatively little degradation, a second wear level WEAR-LEVEL 2 indicates more degradation than the first wear level WEAR-LEVEL 1, and a third wear level WEAR-LEVEL 3) may indicate more deterioration than the second wear level WEAR-LEVEL 2. For example, a memory block BLK1 at the first wear level WEAR-LEVEL 1 may have a relatively low P/E cycle, a memory block BLKz at the second wear level WEAR-LEVEL 2 may have a higher P/E cycle than that of the first wear level WEAR-LEVEL 1, and a memory block BLK2 at the third wear level WEAR-LEVEL 3 may have a higher P/E cycle than that of the second wear level WEAR-LEVEL 2. That is, a higher wear level may indicate more degradation. The wear level of a memory block can be determined according to a predetermined reference based on the number of P/E cycles of the memory block. The wear leveling manager 360 (in FIG. 3) may store wear level information of each memory block in the form of a table in the memory 340. However, the present disclosure is not limited thereto, and the wear leveling manager 360 may also store the number of P/E cycles of each memory block in the form of a table in the memory 340.

FIG. 8 illustrates an example of a zone management table according to some implementations.

Referring to FIG. 8, the zone management table 800 may include a zone number (or identification information) 810, host information 820 corresponding to the zone, read/write request information 830 and 840 of the zone, and a write pointer 850.

In some implementations, each of the zones may store data of a corresponding host among the hosts. Specifically, the zone management table 800 may store a plurality of zone numbers 810 and host information 820 corresponding to each of the zones. For example, the host information may include, but is not limited to, a process address space identifier PASID, application information, a group identifier group ID, a context identifier context ID, or a stream identifier stream ID. When the server 210 (in FIG. 2) receives a command from a host, it may transfer corresponding host information to a storage device 230 (in FIG. 2).

Read request information 830 may indicate the number of times a read request has been received by a zone, and write request information 840 may indicate information about the number of times a write request has been received by the zone. In some implementations, the number of times a zone receives a read request may be a sum of the number of times read operations are performed on word lines of the memory blocks included in the zone. The number of times a zone receives a write request may be a sum of the number of times a write operation is performed on word lines of the memory blocks included in the zone. In some implementations, the zone management table 800 may further include information related to a number of erases or read errors of the memory blocks included in the zone.

The write pointer 850 indicates a storage position where data was last written in the zone. Specifically, when a storage device receives a write request from a host, it may check the zone corresponding to a logical address included in the write request, may check a storage position where data was last written in the checked zone, and may sequentially store the received write data from a next storage position of the checked storage position. When a write operation is completed in a given zone, a position where the data was last stored may be updated as the write pointer 850. Additionally, the zone management table 800 may further include start address information indicating a start position of the zone.

In additional implementations, the zone management table 800 may further include R/W level information for each of the zones. Specifically, the zone management table 800 may include R/W level information of each zone determined according to read/write request information of the memory blocks included in each zone. A method for determining the R/W level of each of the multiple zones is the same as or similar to the method for determining the R/W level of the memory block of FIG. 6, so a detailed description thereof will be omitted herein. Additionally, the zone management table 800 may further include memory block information included in the zone.

In some implementations, when the R/W manager 350 (in FIG. 3) may receive a read request for a read target word line from the host or a write request for a write-target word line, it may update read/write request information 830 and 840 of the zone management table 800 based on the R/W table indicating read/write request information for each memory block.

Meanwhile, the storage system may receive a request from multiple hosts to open additional zones in addition to zones opened to each host, or a request from the host to change a size of a zone opened to the host. In this case, the storage system may determine which memory blocks of a zone to additionally open based on properties of the zones already opened to the host. Alternatively, the storage system may determine which memory blocks to retrieve from a zone based on the properties of the zone already open to the host.

Figure 9:
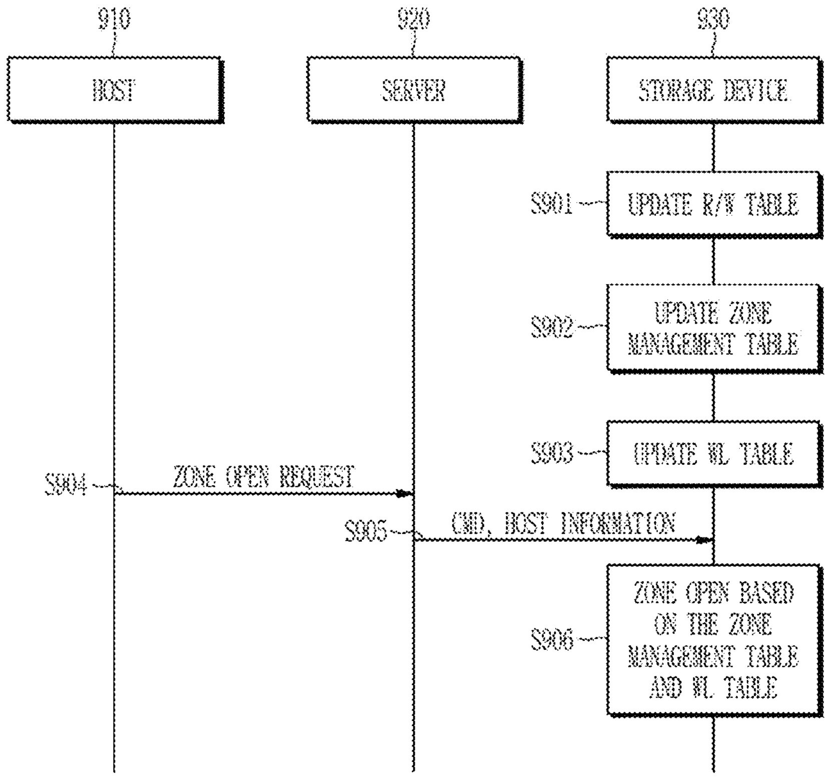
FIG. 9 illustrates a flowchart for describing a zone open method of a storage system according to some implementations.

FIG. 9 illustrates a flowchart for describing a zone open method of a storage system according to some implementations.

The storage device 930 may allocate a plurality of memory blocks to the zones based on initial zone open requests from a plurality of hosts, and open a corresponding zone among the zones as an initial zone for each of the hosts.

Referring to FIG. 9, in some implementations, the storage device 930 may update an R/W table (S901). For example, when the R/W manager 350 (in FIG. 3) of the storage device 930 receives a read request or write request for a word line or page included in a first memory block from a host (or server), it may update the R/W table 342 by increasing the number of times a read request or a write request is received corresponding to the first memory block of the R/W table 342 (in FIG. 3) stored in the memory 340 (in FIG. 3).

In some implementations, the storage device 930 may update the zone management table (S902). For example, when the R/W table of the first memory block is updated according to a request from the host (or server), the zone manager 370 (in FIG. 3) of the storage device 930 may update the zone management table 343 (in FIG. 3) by increasing a number of times a read request or a write request is received for a zone including the first memory block.

In some implementations, the storage device 930 may update the wear level table (S903). For example, the wear leveling manager 360 (in FIG. 3) of the storage device 930 may count P/E cycles for each memory block, and may classify the memory blocks into wear levels according to a predetermined reference based on a number of P/E cycles counted. The wear leveling manager 360 may classify memory blocks into wear levels based on the number of P/E cycle counted, and may update the wear level table 341 (in FIG. 3). Alternatively, the wear leveling manager 360 may update the number of P/E cycles for each memory block as a wear level in the wear level table 341.

In the above, an order of performance and a number of times of performance of steps S901 to S903 may vary and are not limited to the above description.

In some implementations, a host 910 may request a zone open (S904). In some implementations, a host 910 may transmit a zone open request to a server 920. In some implementations, a host 910 may transmit a zone open request to the server 920 to command the storage device 930 to open the additional zones. Each of the multiple hosts stores data in a corresponding zone, so it requests a server 920 to open additional zones as needed.

In some implementations, the server 920 may transmit a zone open command and corresponding host information to the storage device 930 in response to a zone open request from the host 910 (S905). The server 920 may transmit a process address space identifier PASID, application information, or group identifier as host information to the storage device (930).

In some implementations, when the storage device 930 receives a zone open command and host information from the server 920, it may open a zone to the corresponding host based on the zone management table and the wear level table of memory blocks (S906). Specifically, when the storage device 930 receives the zone open command and the host information from the server 920, it may check the R/W level information of the zone corresponding to the host from the zone management table. When the storage device 930 receives the zone open command and the host information from the server 920, it may check the wear level of memory blocks to be additionally opened to the host from the wear level table.

In some implementations, the storage device 930 may divide memory blocks into wear levels and, by referencing R/W level information of a zone corresponding to a host, may additionally open memory blocks having a corresponding wear level as a new zone to the host. For example, if the write count of a zone corresponding to a host is greater than the read count, the R/W level of the zone corresponding to the host may have the first level WRITE INTENSIVE, and the storage device 930 may additionally open memory blocks having a wear level (e.g., the first wear level) indicating a less deteriorated state as a new zone to the host. Alternatively, if the read count of the zone corresponding to the host is greater than the write count, the R/W level of the zone corresponding to the host may have the third level READ INTENSIVE, and the storage device 930 may additionally open memory blocks having a wear level (e.g., the third wear level) indicating a more deteriorated state as a new zone to the host.

Figure 10:
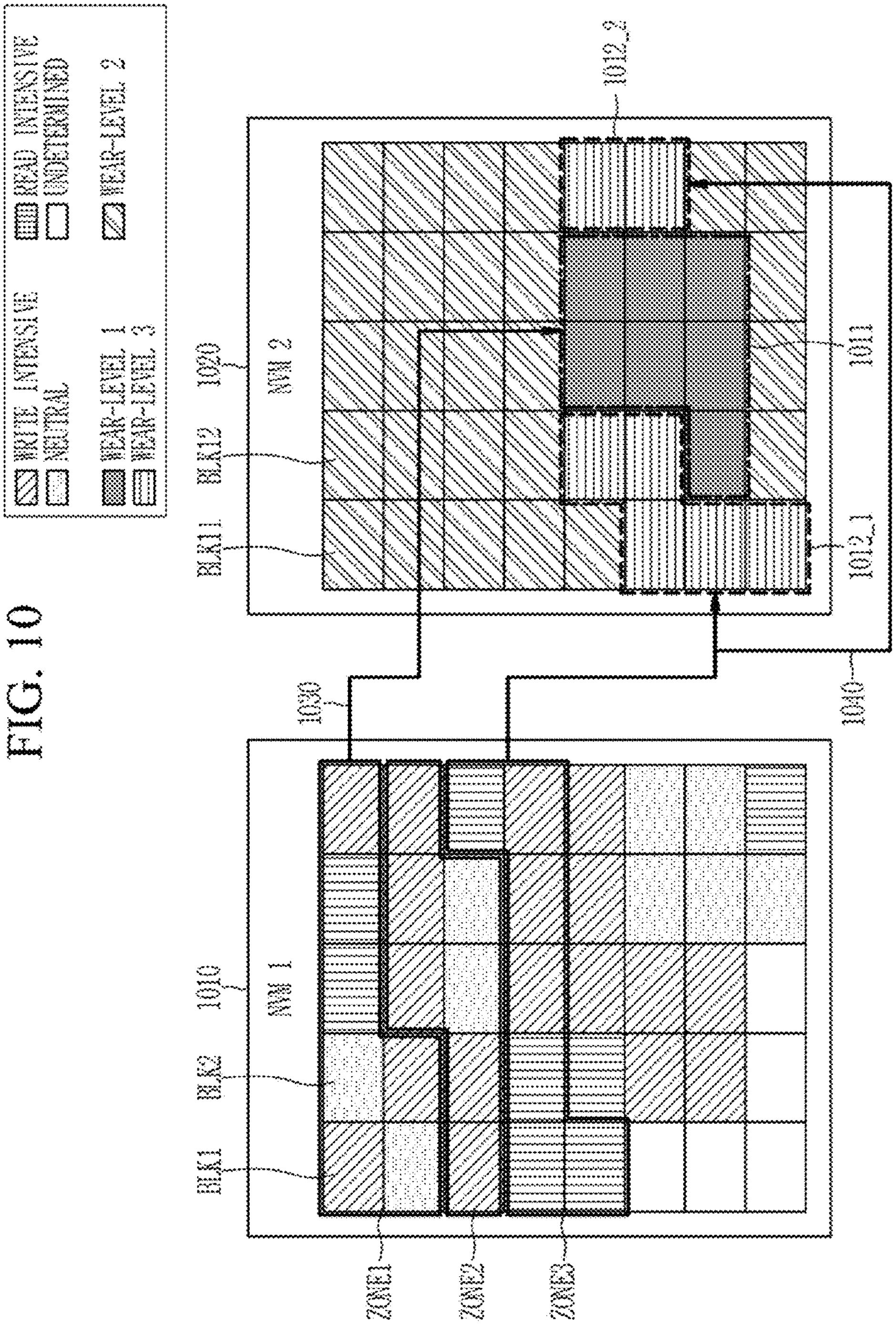
FIG. 10 illustrates a block diagram for describing a zone open process of a storage system according to some implementations.

FIG. 10 illustrates a block diagram for describing a zone open process of a storage system according to some implementations.

Referring to FIG. 10, a first non-volatile memory 1010 may include a plurality of zones ZONE1, ZONE2, ZONE3, Each of the zones ZONE1, ZONE2, ZONE3, . . . may include a plurality of memory blocks BLK1, BLK2, A R/W level of each of the zones ZONE1, ZONE2, ZONE3, . . . may be determined based on R/W levels of the memory blocks included in the multiple zones ZONE1, ZONE2, ZONE3, For example, the R/W level of the first zone ZONE1 may be determined as the first level WRITE INTENSIVE according to the R/W levels of the memory blocks included in the first zone ZONE1. The R/W level of the second zone ZONE2 may be determined as the first level WRITE INTENSIVE according to the R/W level of the memory blocks included in the second zone ZONE2. The R/W level of the third zone ZONE3 may be determined as the third level READ INTENSIVE according to the R/W level of the memory blocks included in the third zone ZONE3.

A second non-volatile memory 1020 may include a plurality of memory blocks BLK11, BLK12, A wear level of the memory blocks BLK11, BLK12, . . . may be determined based on a number of P/E cycles of each of the memory blocks BLK11, BLK12, . . . . For example, the first wear level WEAR-LEVEL 1 may have a relatively low P/E cycle, the second wear level WEAR-LEVEL 2 may have a higher P/E cycle than that of the first wear level WEAR-LEVEL 1, and the third wear level WEAR-LEVEL 3 may have a higher P/E cycle than that of the second wear level WEAR-LEVEL 2.

Each of the zones ZONE1, ZONE2, ZONE3, . . . may correspond to multiple hosts. For example, the first zone ZONE1 may correspond to a first host and store data of the first host, the second zone ZONE2 may correspond to a second host and store data of the second host, and the third zone ZONE3 may correspond to a third host and store data of the third host.

In some implementations, the zone manager 370 (in FIG. 3) may open a new zone including memory blocks to the host, upon request of the host. In this case, the storage controller 300 may consider the R/W level of the zone corresponding to the host and the wear level of the memory blocks to be opened to the host as a new zone. For example, when the storage controller 300 (in FIG. 3) receives a zone open request from the first host, the zone manager 370 may check that the R/W level of the first zone ZONE1 in the first non-volatile memory 1010 corresponding to the first host is the first level WRITE LEVEL, and may additionally open memory blocks 1011 having a wear level (the first wear level) indicating a less deteriorated state in the second non-volatile memory 1020 as a new zone to the first host 1030. Alternatively, when the storage controller 300 receives a zone open request from the third host, the zone manager 370 may check that the R/W level of the third zone ZONE3 corresponding to the third host within the first non-volatile memory 1010 is the third level READ LEVEL, and may additionally open memory blocks 1012_1 and 1012_2 having a wear level (the third wear level) indicating a more deteriorated state in the second non-volatile memory 1020 as a new zone to the third host 1040.

Herein, for better understanding and ease of description, it is described that the memory blocks BLK1, BLK2, . . . of the zone already opened to the host and the memory blocks BLK11, BLK12, . . . to be opened as a new zone to the host are included in different non-volatile memories, but the present disclosure is not limited thereto, and memory blocks of a zone already allocated to the host and memory blocks to be opened as a new zone to the host may be included in a same non-volatile memory.

In some implementations, the storage controller 300 may further consider cell types of the memory blocks that are a target of the zone to be opened. For example, the storage controller 300 may check that a R/W level of the first zone ZONE1 corresponding to the first host is the first level WRITE LEVEL. When the storage controller 300 additionally opens memory blocks 1011 having a wear level (first wear level) indicating a less deteriorated state as a new zone to the first host, the storage controller 300 may determine memory blocks including a triple-level cell TLC or a quadruple-level cell QLC among the memory blocks 1011 having the first wear level as a zone to be additionally opened to the first host. Alternatively, the storage controller 300 may check that a R/W level of the third zone ZONE3 corresponding to the third host is the third level READ LEVEL. When the storage controller 300 additionally opens memory blocks 1012_1 and 1012_2 having a wear level (third wear level) indicating a more deteriorated state as a new zone to the third host, the storage controller 300 may determine memory blocks including a single-level cell SLC or a multi level cell MLC among the memory blocks 1012_1 and 1012_2 having the third wear level as a zone to be additionally opened to the third host.

Herein, it has been described that the zone manager 370 determines the memory blocks included in the zone to be opened to the host based on the wear level of the memory blocks, but the wear leveling manager 360 may store a number of P/E cycles of each memory block in the memory 340 as wear level information in the form of a table, and the zone manager 370 may determine the memory blocks included in the zone to be opened to the host based on the number of P/E cycles of the memory blocks. For example, when the storage controller 300 receives a zone open request from the third host, the zone manager 370 may check that the R/W level of the third zone ZONE3 corresponding to the third host is the third level READ LEVEL, may sequentially or randomly determine memory blocks with a large number of P/E cycles according to the logical address, and may additionally open them as a new zone to the third host.

Figure 11:
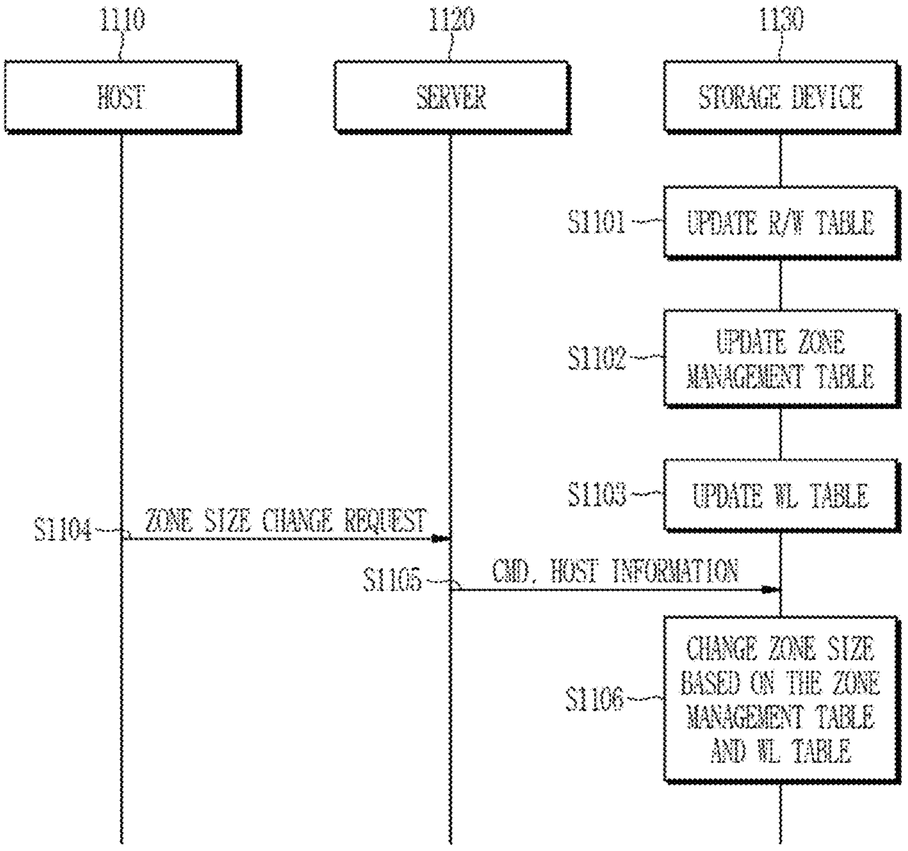
FIG. 11 illustrates a flowchart for describing a zone size change method of a storage system according to some implementations.

FIG. 11 illustrates a flowchart for describing a zone size change method of a storage system according to some implementations. Descriptions identical or similar to those in FIG. 9 will be omitted herein.

Referring to FIG. 11, in some implementations, the storage device 1130 may update an R/W table (S1101). In some implementations, the storage device 1130 may update the zone management table (S1102). In some implementations, the storage device 1130 may update the wear level table (S1103). In the above, an order of performance and a number of times of performance of steps S1101 to S1103 may vary and are not limited to the above description.

In some implementations, a host 1110 may request a zone size change (S1104). Specifically, the host 1110 may request that the server expand a size of a zone by adding memory blocks to the zone opened to the host, or that the server reduce the size of the zone by reclaiming some of the memory blocks included in the zone opened to the host.

In some implementations, the server 1120 may transmit a zone size change command and corresponding host information to the storage device 1130 in response to a zone size change request from the host 1110 (S1105).

In some implementations, when the storage device 1130 receives the zone size change command and the host information from the server 1120, it may change the size of the zone based on the zone management table 343 (in FIG. 3) and the wear level table of the memory blocks 341 (in FIG. 3) (S1106). Specifically, when the storage device 1130 receives a zone size expansion command and host information from the server, it may check R/W level information of the zone corresponding to the host from the zone management table 343, and may check a wear level of the memory blocks to be added to the zone corresponding to the host from the wear level table 341. For example, if the read count of the zone corresponding to the host is greater than the write count, the R/W level of the zone corresponding to the host may have the third level READ INTENSIVE, and the storage device 1130 may add memory blocks having a wear level (e.g., the third wear level) indicating a more deteriorated state to a corresponding zone.

Alternatively, when the storage device 1130 receives a zone size reduction command and host information from the server, it may check R/W level information of the zone corresponding to the host from the zone management table 343, and may check the wear level of memory blocks to be reclaimed from the zone from the wear level table 341. For example, if the write count of the zone corresponding to the host is greater than the read count, the R/W level of the zone corresponding to the host may have the third level WRITE INTENSIVE, and the storage device 1130 can reclaim memory blocks having a wear level (e.g., a third wear level) indicating a more deteriorated state within the corresponding zone from a corresponding zone.

As described above, the read/write levels and the wear levels may be managed in units of memory blocks and/or zones, and zone openings or zone size changes may be performed, but in some implementations, the storage device may manage the read/write levels and the wear level in units of logical block addresses (LBA), and perform the zone openings or the zone size changes in units of LBAs.

Figure 12:
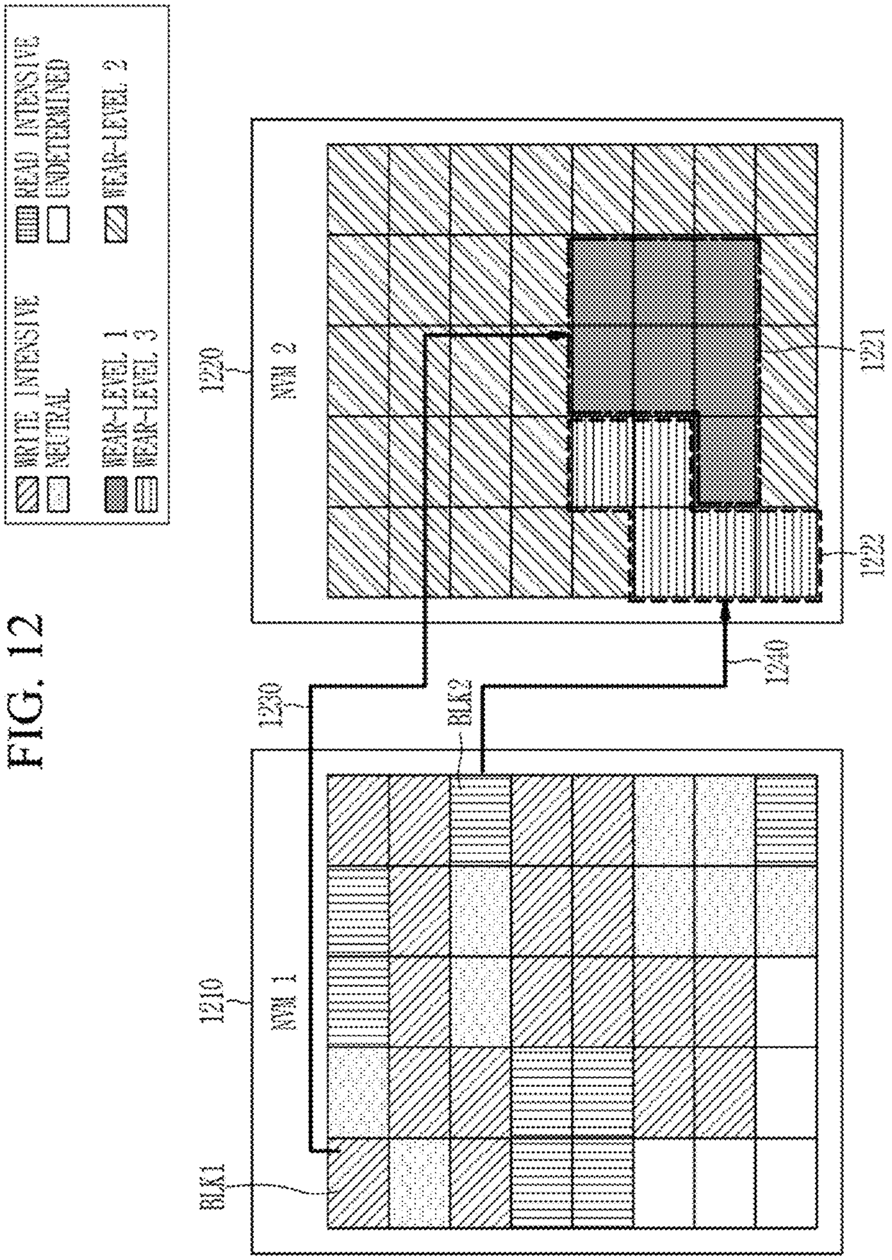
FIG. 12 illustrates a block diagram for describing an operating method of a storage system according to some implementations.

FIG. 12 illustrates a block diagram for describing an operating method of a storage system according to some implementations.

In some implementations, the FTL 330 (in FIG. 3) of the storage controller 300 (in FIG. 3) may perform garbage collection to secure available capacity within the non-volatile memory 1210. A garbage collection operation may be an operation that copies valid data of a block of non-volatile memory 1210 to a new block and erases the existing block. Specifically, the nonvolatile memory 1210 may not be overwritten, so when a request to write new data to a block in which data is written is received from the host, the storage controller 300 may write the new data to a new block of the nonvolatile memory 1210. In this case, blocks where data was previously written may be invalidated, and a logical address of blocks where data was previously written may be mapped to new blocks where new data will be written. In this way, the FTL 330 removes invalidated blocks and merges only blocks with valid data written in them, which is called garbage collection. In some implementations, a garbage collection operation may be performed on a page-by-page basis.

In some implementations, when the storage controller 300 performs the garbage collection, it may consider a R/W level of an existing block and a wear level of a new block. For example, when performing garbage collection on the first memory block BLK1 of the first non-volatile memory 1210, the storage controller 300 may determine that the R/W level of the first memory block BLK1 is the first level WRITE INTENSIVE based on the R/W table 342 (in FIG. 3). The storage controller 300 may determine some of the memory blocks 1221 having a wear level (first wear level) indicating a less deteriorated state of the second non-volatile memory 1220 as new blocks to be written with new data based on the R/W level of the first memory block BLK1 (1230). Alternatively, when performing the garbage collection on the second memory block BLK2 of the first non-volatile memory 1210, the storage controller 300 may determine that the R/W level of the second memory block BLK2 is the third level READ INTENSIVE based on the R/W table 342. The storage controller 300 may determine some of the memory blocks 1222 having a wear level (third wear level) indicating a more deteriorated state of the second non-volatile memory 1220 as blocks to be written with new data based on the R/W level of the second memory block BLK2 (1240).

Herein, for better understanding and ease of description, it is described that the memory blocks BLK1 and BLK2 already allocated to the host and the memory blocks 1221 and 1222 to which new data is to be written are included in different non-volatile memories, but the present disclosure is not limited thereto, and memory blocks already allocated to the host and memory blocks to be newly allocated to the host may be included in a same non-volatile memory.

Meanwhile, the implementations of the present disclosure are not limited thereto. For example, when data movement is required due to reliability issues of a memory block that previously stores data, etc., the R/W level of the existing memory block or the zone including the existing memory block and the wear level of the memory block where data will be newly stored may also be considered.

Figure 13:
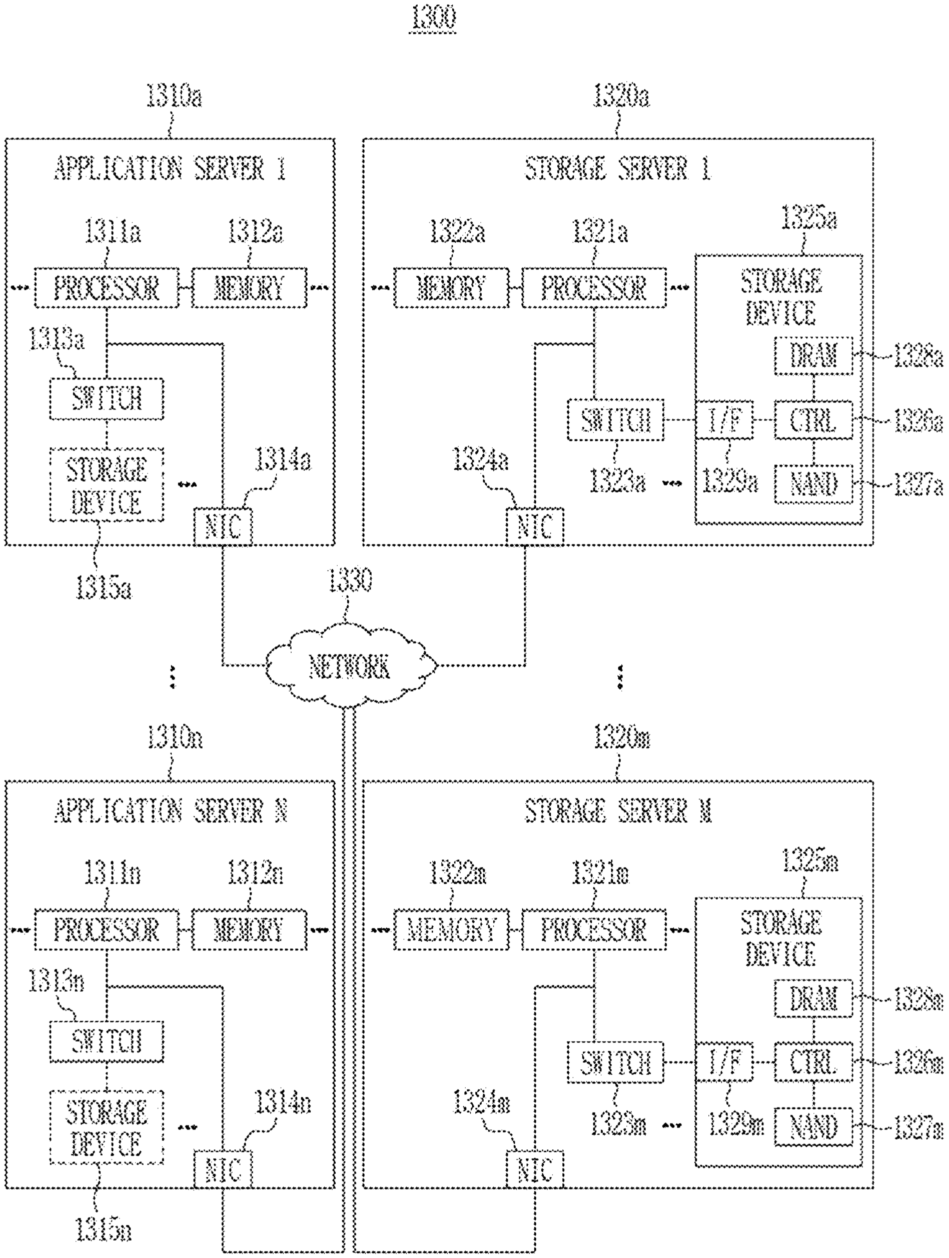
FIG. 13 illustrates a block diagram showing a data center to which a storage system is applied according to some implementations.

FIG. 13 illustrates a block diagram showing a data center to which a storage system is applied according to some implementations.

Referring to FIG. 13, a data center 1300, which is a facility that collects various data, provides services, may also be referred to as a data storage center. The data center 1300 may be a system for operating a search engine and a database, and may be a computing system used in a corporate or government institution such as a bank. The data center 1300 may include application servers 1310*a*, . . . , and 1310*n* and storage servers 1320*a*, . . . , and 1320*m*. A number of application servers 1310*a*, . . . , and 1310*n* and a number of storage servers 1320*a*, . . . , and 1320*m* may be selected variously according to other implementations, and the number of application servers 1310*a*, . . . , and 1310*n* and the number of storage servers 1320*a*, . . . , and 1320*m* may be different from each other.

The application server 1310 or the storage server 1320 may include at least one of processors 1311 and 1321, and memories 1312 and 1322. Taking the storage server 1320 as an example, the processor 1321 may control a general operation of the storage server 1320, and may access the memory 1322 to execute commands and/or data loaded into the memory 1322. The memory 1322 may be a double data rate synchronous DRAM (DDR SDRAM), a high bandwidth memory (HBM), a hybrid memory cube (HMC), a dual in-line memory module (DIMM), an Optane DIMM, or a non-volatile DIMM (NVMDIMM). According to other implementations, a number of processors 1321 and a number of memories 1322 included in the storage server 1320 may be selected in various ways. In some implementations, the processor 1321 and the memory 1322 may provide a processor-memory pair. In some implementations, a number of the processors 1321 and the number of the memory 1322 may be different. The processor 1321 may include a single-core processor or a multi-core processor. The description for the storage server 1320 may also be similarly applied to the application server 1310. According to other implementations, the application server 1310 may not include a storage device 1315. The storage server 1320 may include at least one storage device 1325. A number of storage devices 1325 included in the storage server 1320 may vary according to other implementations.

The application servers 1310*a*, . . . , and 1310*n* and the storage servers 1320*a*, . . . , and 1320*m* may communicate with each other via a network 1330. The network 1330 may be implemented using fiber channel (FC), Ethernet, or the like. In this case, the FC, which is a medium used for relatively high-rate data transmission, may use an optical switch providing high performance and high availability. Depending on an access method of the network 1330, the storage servers 1320*a*, . . . , and 1320*m* may be provided as a file storage, a block storage, or an object storage.

In some implementations, the network 1330 may be a storage-only network, such as a storage area network (SAN). For example, the SAN may be an FC-SAN that uses an FC network and is implemented depending on a FC protocol (FCP). As another example, the SAN may be an IP-SAN that uses a TCP/IP network and is implemented depending on an iSCSI (SCSI over TCP/IP or Internet SCSI) protocol. In other implementations, the network 1330 may be a general network, such as a TCP/IP network. For example, the network 1330 may be implemented depending on protocols such as a FC over Ethernet (FCoE), a network attached storage (NAS), and a NVMe over Fabrics (NVMe-oF).

Hereinafter, the description will focus on the application server 1310 and the storage server 1320. A description of the application server 1310 may also apply to other application servers 1310*n*, and a description of the storage server 1320 may also apply to other storage servers 1320*m*.

The application server 1310 may store data requested to be stored by a user or client in one of the storage servers 1320*a*, . . . , and 1320*m* through the network 1330. Additionally, the application server 1310 may obtain data requested for reading by a user or client from one of the storage servers 1320*a*, . . . , and 1320*m* through the network 1330. For example, the application server 1310 may be implemented as a web server or a database management system (DBMS).

The application server 1310 may access a memory 1312*n* or a storage device 1315*n* included in another application server 1310*n* through the network 1330, or may access a memory 1322*a*, . . . , or 1322*m* or a storage device 1325*a*, . . . , or 1325*m* included in a storage server 1320*a*, . . . , or 1320*m* through the network 1330. Accordingly, the application server 1310 may perform various operations on data stored in the application servers 1310*a*, . . . , and 1310*n* and/or the storage servers 1320*a*, . . . , and 1320*m*). For example, the application server 1310 may execute commands to move or copy data between the application servers 1310*a*, . . . , and 1310*n* and/or the storage servers 1320*a*, . . . , and 1320*m*. In this case, data may be moved from the storage devices 1325*a*, . . . , and 1325*m* of the storage servers 1320*a*, . . . , and 1320*m* to the memories 1322*a*, . . . , and 1322*m* of the storage servers 1320*a*, . . . , and 1320*m*, or directly to the memories 1312*a*, . . . , and 1312*n* of the application servers 1310*a*, . . . , and 1310*n*. Data moving through the network 1330 may be encrypted for security or privacy.

Taking the storage server 1320 as an example, an interface circuit 1329 may provide a physical connection between the processor 1321 and the controller 1326 and a physical connection between the NIC 1324 and the controller 1326. For example, the interface circuit 1329 may be implemented in a direct attached storage (DAS) manner that directly connects the storage device 1325 with a dedicated cable. In addition, for example, the interface circuit 1329 may be implemented in various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital SD)) card, MultiMediaCard (MMC), embedded multi-media card (eMMC), universal flash storage (UFS), embedded universal flash storage (eUFS), compact flash (CF) card interface, etc.

The storage server 1320 may further include a switch 1323 and a NIC 1324. The switch 1323 may selectively connect the processor 1321 and the storage device 1325, or may selectively connect the NIC 1324 and the storage device 1325 under the control of the processor 1321. Similarly, the application server 1310 may further include a switch 1313 and a NIC 1314.

In some implementations, the NIC 1324 may include a network interface card, a network adapter, and the like. The NIC 1324 may be connected to the network 1330 by a wired interface, a wireless interface, a Bluetooth interface, an optical interface, or the like. The NIC 1324 may include an internal memory, a digital signal processor (DSP), a host bus interface, and the like, and may be connected to the processor 1321 and/or switch 1323 through the host bus interface. The host bus interface may be implemented as one of the examples of interface 1329 described above. In some implementations, the NIC 1324 may be integrated with at least one of a processor 1321, a switch 1323, or the storage device 1325.

A processor in the storage server 1320*a*, . . . , or 1320*m* or the application server 1310*a*, . . . , or 1310*n* may program or read data by transmitting a command to the storage device 1315*a*, . . . , or 1315*n*, or 1325*a*, . . . , or 1325*m* or the memory 1312*a*, . . . , or 1312*n*, or 1322*a*, . . . , or 1322*m*. In this case, the data may be data error-corrected through an error correction code (ECC) engine. The data is data that has undergone data bus inversion (DBI) or data masking (DM) processing, and may include cyclic redundancy code (CRC) information. The data may be encrypted for security or privacy.

The storage device 1325*a*, . . . , or 1325*m* may transmit control signals and command/address signals to a NAND flash memory device 1327*a*, . . . , or 1327*m* in response to a read command received from the processor. Accordingly, when reading data from the NAND flash memory device 1327*a*, . . . , or 1327*m*, a read enable (RE) signal may be input as a data output control signal and play a role in outputting data to the DQ bus. A data strobe (DQS) may be generated using the RE signal. Command and address signals may be latched into a page buffer depending on a rising or falling edge of a write enable (WE) signal.

The controller 1326 may generally control an operation of the storage device 1325. In some implementations, the controller 1326 may include a static random access memory (SRAM). The controller 1326 may write data to the NAND flash 1327 in response to a write command, or may read data from the NAND flash (1327) in response to a read command. For example, the write command and/or read command may be provided from the processor 1321 within the storage server 1320, the processor 1321*m* within another storage server 1320*m*, or the processor 1311*a*, . . . , or 1311*n* within the application server 1310*a*, . . . , or 1310*n*. A DRAM 1328 may temporarily store (buffer) data to be written to the NAND flash 1327 or data read from the NAND flash 1327. Additionally, the DRAM 1328 may store meta data. Herein, metadata is user data or data generated by the controller 1326 to manage the NAND flash 1327.

The storage devices 1325*a*, . . . , and 1325*m* may be implemented based on the storage devices according to the implementations of the present disclosure described above with reference to FIGS. 1 to 12 and may be implemented to perform a driving method according to the implementations of the present disclosure.

The storage devices 1325*a*, . . . , and 1325*m* may additionally open memory blocks having corresponding wear levels as zones to the corresponding application server based on the attribute information of the zone corresponding to the corresponding application server, according to the request for additional zone opening of the application servers 1310*a*, . . . , or 1310*n*.

The storage devices 1325*a*, . . . , and 1325*m* may add memory blocks having corresponding wear levels to a zone corresponding to the application server, or may retrieve memory blocks having non-corresponding wear levels from a zone corresponding to the application server, based on attribute information of the zone corresponding to the application server, according to a request for changing a zone size of the application servers 1310*a*, . . . , and 1310*n*.

Implementations of the present disclosure may be usefully utilized in storage devices and any electronic devices and systems including the same. For example, the implementations of the present disclosure may be more usefully applied to electronic systems such as a personal computer, a server computer, a data center, a workstation, a laptop, a cellular phone, a smart phone, a MP3 player, a personal digital assistant, a portable multimedia player, a digital TV, a digital camera, a portable game console, a navigation device, a wearable device, an Internet of things (IoT) device, an Internet of everything (IoE) device, an e-book, a virtual reality (VR) device, an augmented reality (AR) device, a drone, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While this disclosure has been described in connection with what is presently considered to be practical implementations, it is to be understood that the disclosure is not limited to the disclosed implementations, but, on the contrary, is intended to cover various modifications and equivalent dispositions included within the spirit and scope of

What is claimed is:

1. A storage system comprising:

a non-volatile memory configured to include a plurality of memory blocks, wherein the plurality of memory blocks includes a first zone comprising a first subset of memory blocks of the plurality of memory blocks and a second zone comprising a second subset of memory blocks of the plurality of memory blocks; and a storage controller configured to receive a zone open request from a host, open the second zone to the host based on read and write count information of the first zone corresponding to the host and based on a wear level of the plurality of memory blocks, wherein the second zone includes first memory blocks that are less deteriorated than a predetermined memory block of the plurality of memory blocks based on a read count of the first zone being less than a write count of the first zone, or the second zone includes second memory blocks that are more deteriorated than a predetermined memory block of the plurality of memory blocks based on the read count of the first zone being greater than the write count of the first zone.

2. The storage system of claim 1, wherein the storage controller is configured to determine the wear level of the plurality of memory blocks based on the write count of the first zone, the read count of the first zone, and a predetermined threshold of a difference between the write count of the first zone and the read count of the first zone.

3. The storage system of claim 1, wherein the storage controller is configured to:

open the second zone, based on the first memory blocks having a first wear level less deteriorated than a predetermined memory block of the plurality of memory blocks, by opening the first memory blocks to the host as the second zone, wherein the first memory blocks include a triple-level cell (TLC) or a quadruple-level cell (QLC); and open the second zone, based on the second memory blocks having a second wear level more deteriorated than the predetermined memory block of the plurality of memory blocks, by opening the second memory blocks to the host as the second zone, wherein the second memory blocks include a single-level cell (SLC) or a multi-level cell (MLC).

4. The storage system of claim 1, wherein the storage controller is configured to determine a wear level of the plurality of memory blocks based on program and erase cycles of the plurality of memory blocks.

5. The storage system of claim 1, wherein the read and write count information of the first zone includes read and write count information of the first subset of memory blocks.

6. The storage system of claim 1, wherein the storage controller is configured to:

add at least a first memory block of the plurality of memory blocks to the first zone based on the read and write count information of the first zone and based on the wear level of the plurality of memory blocks when receiving, from the host, a zone size expansion command of the first zone; and reclaim at least one memory block of the first subset of memory blocks from the first zone based on the read and write count information of the first zone and based on the wear level of the first subset of memory blocks when receiving, from the host, a zone size reduction command of the first zone.

7. The storage system of claim 6, wherein the storage controller is configured to, based on receiving, from the host, the zone size expansion command of the first zone:

add the at least first memory block to the first zone, when the write count of the first zone is greater than the read count of the first zone, wherein the at least first memory block has a first wear level and is less deteriorated than a predetermined memory block of the plurality of memory blocks; and add the at least first memory block to the first zone, when the read count of the first zone is greater than the write count of the first zone, wherein the at least first memory block has a second wear level and is more deteriorated than the predetermined memory block of the plurality of memory blocks, and wherein the storage controller is configured to, based on receiving, from the host, the zone size reduction command of the first zone:

reclaim the at least one memory block from the first zone, when the write count of the first zone is greater than the read count of the first zone, wherein the at least one memory block has the first wear level and is less deteriorated than the predetermined memory block of the first subset of memory blocks; and reclaim the at least one memory block from the first zone, when the read count of the first zone is greater than the write count of the first zone, wherein the at least one memory block has the second wear level and is less deteriorated than the predetermined memory block of the first subset of memory blocks.

8. The storage system of claim 1, wherein the storage controller is configured to store a zone number of the first zone, host information corresponding to the first zone, the read and write count information of the first zone, and a wear level of the plurality of memory blocks.

9. An operating method for a storage system, comprising:

allocating a plurality of memory blocks to a plurality of zones based on a zone open request from each host of a plurality of hosts;

opening a corresponding zone of the plurality of zones to each host of the plurality of hosts;

receiving a zone open request from a first host of the plurality of hosts;

checking a read and write level of a first zone corresponding to the first host of the plurality of zones;

checking a wear level of the plurality of memory blocks;

determining, based on a read count of the first zone being less than a write count of the first zone, that at least one memory block is less deteriorated than a predetermined memory block of the plurality of memory blocks;

determining, based on the read count of the first zone being greater than the write count of the first zone, that at least one memory block is more deteriorated than a predetermined memory block of the plurality of memory blocks; and opening, to the first host as a second zone, at least one memory block having a first wear level more deteriorated than a predetermined memory block of the plurality of memory blocks; or opening, to the first host as a second zone, at least one memory block having a second wear level less deteriorated than the predetermined memory block of the plurality of memory blocks.

10. The operating method of claim 9, wherein receiving the zone open request from the first host of the plurality of hosts includes receiving an additional zone open request from the first host.

11. The operating method of claim 9, comprising determining the wear level of the plurality of memory blocks based on the write count of the first zone, the read count of the first zone, and a predetermined threshold of a difference between the write count of the first zone and the read count of the first zone.

12. The operating method of claim 10, wherein the wear level of the plurality of memory blocks is determined based on at least one of a program and erase cycle, an on-cell count, an off-cell count, a retention time, an erase count, and a number of error bits of read data of the plurality of memory blocks.

13. The operating method of claim 9, wherein receiving the zone open request from the first host of the plurality of hosts includes receiving a zone size expansion command from the first host.

14. The operating method of claim 13, wherein changing the zone opened to the first host based on the read and write level of the first zone and the wear level of the plurality of memory blocks includes:

adding, to the first zone, at least a first memory block having a high wear level, wherein the at least first memory block is more deteriorated than a predetermined memory block of the plurality of memory blocks when a read count of the first zone is greater than a write count of the first zone; or adding, to the first zone, at least one memory block having a low wear level wherein the at least one memory block is less deteriorated than the predetermined memory block of the plurality of memory blocks when the write count of the first zone is greater than the read count of the first zone.

15. The operating method of claim 9, wherein receiving the zone open request from the first host of the plurality of hosts includes receiving a zone size reduction command from the first host.

16. The operating method of claim 15, wherein changing the zone opened to the first host based on the read and write level of the first zone and the wear level of the plurality of memory blocks includes:

reclaiming, from the first zone, at least one memory block having a low wear level wherein the at least one memory block is less deteriorated than a predetermined memory block of the plurality of memory blocks within the first zone when a read count of the first zone is greater than a write count of the first zone; or reclaiming, from the first zone, at least one memory block having a high wear level wherein the at least one memory block is more deteriorated than the predetermined memory block of the plurality of memory blocks within the first zone when the write count of the first zone is greater than the read count of the first zone.

17. The operating method of claim 9, wherein receiving the zone open request from the first host of the plurality of hosts includes:

instructing the first host to request zone close for the first zone based on an amount of data written in the first zone; and receiving a zone close request and an additional zone open request for the first zone from the first host.

18. A storage system comprising:

a non-volatile memory configured to include a plurality of memory blocks, wherein the plurality of memory blocks includes a first memory block and a second memory block of the plurality of memory blocks; and a storage controller configured to receive a request to write data for the first memory block from a host and to perform garbage collection for the first memory block based on read and write count information of the first memory block and a wear level of the plurality of memory blocks, wherein the storage controller is configured to write, based on a read count of the first memory block being greater than a write count of the first memory block, the data to the second memory block having a first wear level that is more deteriorated than a predetermined memory block of the plurality of memory blocks.

19. The storage system of claim 18, wherein the storage controller is configured to determine the wear level of the plurality of memory blocks based on the write count of the first memory block, the read count of the first memory block, and a predetermined threshold of a difference between the write count of the first memory block and the read count of the first memory block.

20. The storage system of claim 18, wherein the wear level of the plurality of memory blocks is determined based on a program and erase cycle.

* * * * *